(12) United States Patent
Masuda et al.

(10) Patent No.: US 8,470,917 B2
(45) Date of Patent: Jun. 25, 2013

(54) PRODUCTION METHOD OF POLYIMIDE SOLUTION AND FLUORINATED POLYIMIDE SOLUTION

(75) Inventors: Go Masuda, Tsukuba (JP); Kozo Tajiri, Suita (JP); Tomomi Makino, Suita (JP); Yoko Matsui, Tsukuba (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1365 days.

(21) Appl. No.: 11/886,073

(22) PCT Filed: Mar. 10, 2006

(86) PCT No.: PCT/JP2006/305303
§ 371 (c)(1),
(2), (4) Date: Sep. 11, 2007

(87) PCT Pub. No.: WO2006/095924
PCT Pub. Date: Sep. 14, 2006

(65) Prior Publication Data
US 2010/0284664 A1  Nov. 11, 2010

(30) Foreign Application Priority Data

Mar. 11, 2005  (JP) .................. 2005-069702

(51) Int. Cl.
*C08K 5/17* (2006.01)
(52) U.S. Cl.
USPC ......................................................... 524/236
(58) Field of Classification Search
USPC ......................................................... 524/236
See application file for complete search history.

(56) References Cited

U.S. PATENT DOCUMENTS 3,640,969 A   2/1972   Suzuki et al.
5,508,427 A   4/1996   Tagami et al.

(Continued)

FOREIGN PATENT DOCUMENTS

EP  1 275 679   1/2003
EP  1 454 945   9/2004

(Continued)

OTHER PUBLICATIONS

Machine translation of JP 2004-292509. Oct. 2004.*

(Continued)

*Primary Examiner* — John Uselding
(74) *Attorney, Agent, or Firm* — Wenderoth, Lind & Ponack, L.L.P.

(57) ABSTRACT

The invention aims to provide a method by which a solution of polyimide can be easily obtained. Further, the invention aims to provide a fluorinated polyimide solution by which fluorinated polyimide excellent especially as an optical material and an electronic functional material can easily be produced. The production method of the soluble polyimide solution according to invention is characterized by mixing a mixture containing a polyamide acid, a cyclodehydration reagent, and a solvent by a rotation-revolution mixing method. Further, the fluorinated polyimide solution of the invention is a solution of polyimide defined by the following formula (II):

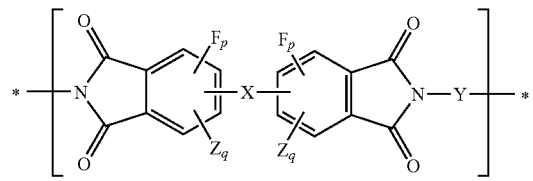

(II)

wherein, X and Y independently represent divalent organic groups; Z represents chlorine atom, bromine atom, or iodine atom; p represents an integer of 1 to 3; q represents an integer of 0 to 2; and p+q=3.

2 Claims, 4 Drawing Sheets

U.S. PATENT DOCUMENTS

| | | | | |
|---|---|---|---|---|
| 5,694,513 | A | * | 12/1997 | Okaniwa ........................ 385/143 |
| 2003/0050407 | A1 | | 3/2003 | Tajiri et al. |
| 2005/0020839 | A1 | * | 1/2005 | Masuda et al. ................. 549/241 |

FOREIGN PATENT DOCUMENTS

| | | |
|---|---|---|
| JP | 3-62868 | 3/1991 |
| JP | 5-1148 | 1/1993 |
| JP | 5-17576 | 1/1993 |
| JP | 7-149896 | 6/1995 |
| JP | 2002-53802 | 2/2002 |
| JP | 2004-292509 | * 10/2004 |
| JP | 2005-37841 | 2/2005 |

OTHER PUBLICATIONS

International Search Report for PCT/JP2006/305303, Jul. 2006.
Notice of Reasons for Refusal (with English translation) issued May 22, 2012 in corresponding Japanese Application No. 2006-515470.

* cited by examiner

Fig. 3

PRODUCTION METHOD OF POLYIMIDE SOLUTION AND FLUORINATED POLYIMIDE SOLUTION

This application is a National Stage application of International Application No. PCT/JP2006/305303, filed Mar. 10, 2006, which claims priority to JP 2005-069702, filed Mar. 11, 2005.

BACKGROUND OF THE INVENTION

1. Field of the Invention

The invention relates to a production method of a polyimide solution and a fluorinated polyimide solution.

2. Description of the Related Art

Polyimide has been utilized widely as an optical material, a wiring substrate material, a photosensitive material, a liquid crystal material, or the like owing to the properties such as the excellent heat resistance and mechanical strength. Accordingly, it is one of important resin materials.

However, from another point of view, polyimide is difficult to be molded attributed to the excellent properties as a material. That is, since polyimide is un-fusible and insoluble in solvents, it is hard, for example, to dissolve it in a solvent and form it in a film or the like. Therefore, it is common that a polyamide acid, a precursor of polyimide, is synthesized from an acid dianhydride and a diamine compound; using the obtained solution, molding is carried out; and after that the molded polyimide product is obtained by heating or using a chemical method.

However, it is needed to carry out heating at a high temperature, generally as high as 250 to 400° C. for several hours or more, for polyimidation of a polyamide acid. As a result, the resin sometimes becomes more. Such coloration becomes a problem particularly in the case where polyimide is used for an optical material, and the light with near-infrared wavelength necessary for light transmission is decreased during information transmission in some cases. Further, an optical waveguide is composed of a core and a clad respectively made of materials having different light refractive indexes, and if polyimide is used for one of the materials, materials which are inferior in heat resistance cannot be used as the other material since polyimidation requires high temperature treatment.

On the other hand, if the heating temperature is set to be low, not only the time taken for polyimidation becomes long but also there occurs a problem that the strength of polyimide to be obtained is lowered. That is, if the heating temperature of a polyamide acid is gradually increased, the molecular weight of the polyamide acid is decreased at a temperature around 150 to 200° C., and re-bonding of molecules and polyimidation occur at a further higher temperature. Accordingly, if polyimidation is carried out at a relatively low temperature for a long time, only polyimide having a low molecular weight and a low strength can be obtained.

As another method of polyimidation of a polyamide acid solution, there is a method of causing azeotropy of water generated at the time of polyimidation by adding xylene, toluene or the like to a polyamide acid solution. The method makes polyimidation at a relatively low temperature, generally about 80 to 200° C., possible. However, the method is inefficient industrially, because it requires an additional step of adding xylene or the like, and further, it takes a relatively long time to achieve a high imidation ratio.

On the contrary, a chemical polyimidation method is capable of carrying out polyimidation at a relatively low temperature within a short time and thus efficient. However, the polyamide acid solution itself is unstable and there still remains a problem that the molecular weight of a polyamide acid becomes low. Recently, it is proved that such a phenomenon occurs even in the absence of water. Also, since the viscosity of a polyamide acid solution is high, it is difficult to evenly mix a dehydration cyclization agent for polyimidation. Such a problem particularly becomes outstanding in large scale and industrial execution. On the other hand, if the solvent amount is increased and the viscosity is lowered to make even mixing of the reagent easy, the waste solution amount is increased and it cannot be thus applicable for large scale operation.

Accordingly, techniques of directly obtaining a polyimide solution by dissolving polyimide in a solvent but not obtaining polyimide from a polyamide acid solution have been developed. If such a polyimide solution is used, a polyimide product can be produced by simply removing a solvent without requiring treatment at an excess high temperature.

For example, Japanese Unexamined Publication No. 5-17576 discloses soluble aromatic polyimide. According to the examples, it is said that the polyimide can be dissolved in a concentration of 15% in N,N-dimethylformamide or the like.

However, in the examples of this prior art, a polyamide solution is chemically polyimidated to obtain a polyimide powder. Herein, although detailed conditions of the scale of the example are not written, it becomes more difficult to evenly mix a dehydration cyclization reagent in a highly viscous polyamide acid solution as the scale becomes bigger. Therefore, the technique is supposed to be unsuitable for large scale execution. Also, in this technique, once powdered polyimide is dissolved in a solvent to obtain a solution, which is a technique for specified polyimide having high solubility. Generally, as the concentration of polyimide is increased more, the viscosity of the solution is also increased more, and a common stirrer cannot deal with the solution.

Also, Japanese Unexamined Publication No. 3-62868 discloses polyimide varnish for an optical material. The varnish is obtained by dissolving a polyamide acid obtained by reaction of a specified tetracarboxylic acid anhydride and diamine compound, and imidated in a range of imidation ratio from 20 to 98% in a solvent. However, in this technique, the polyamide acid solution is heated at a relatively low temperature from 70 to 250° C. to be imidated, and therefore, it is supposed that the molecular weight is decreased.

Not to change the subject, but Japanese Unexamined Publication No. 7-149896 discloses a method of producing a polyamide acid solution by mixing an oligomer solution of a tetracarboxylic acid and a diamine component solution by a rotation-revolution type mixing method. However, the method aims to produce solely a polyamide acid solution and there is no description of a polyimide solution.

Recently polyimide having fluorine in substituent groups has drawn attention as polyimide having sufficient heat resistance to fabricate an optoelectronic integrated circuit and a low light transmission loss in the near infrared region, particularly the optical communication wavelength region (1.0 to 1.7 μm) and thus suitable for an optical material. For example, Japanese Unexamined Publication No. 5-1148 discloses perfluorinated polyimide in which all C—H bonds are substituted with C—F bonds.

However, in the examples of this prior technique, polyimide is obtained by applying a solution of a polyamide acid as a precursor to an aluminum plate by spin coating, and removing the solvent and firing by heating at 70 to 350° C. for several hours. However, in the case of such a method, the light transmission loss of the polyimide particularly in a wavelength region of 1.0 μm or shorter is often high. In these years, with respect to optical materials, particularly excellent optical properties have been required, and therefore the method for carrying out polyimidation by heating at a high temperature may possible result in an adverse consequence.

On the other hand, as disclosed in Japanese Unexamined Publication No. 5-1148, if polyimide is dissolved in a solvent to produce varnish and the varnish is used for producing an optical waveguide or the like, heating is required simply to remove the solvent and accordingly, it may be possible to produce high quality products. However, in the case of polyimide obtained from a polyamide acid solution by heating at a high temperature, it is supposed that crosslinking reaction among molecules takes place due to high temperature firing, and thus such a polyimide is completely insoluble in a solvent.

DISCLOSURE OF THE INVENTION

As described above, the technical idea of using a polyimide solution as varnish in place of a polyamide acid solution which is inferior in stability is known. However, a conventional polyimide solution is a solution of particularly selected polyimide having high solubility but not a polyimide solution with a high concentration and a high viscosity using common soluble polyimide.

Also, polyimide substituted with fluorine and suitable for an optical material has been developed so far. However, since this polyimide is produced from a polyamide acid solution, the quality may possibly be deteriorated because of high temperature treatment. For that, a technique of easily producing polyimide with further lowered light transmission loss has been also desired.

Accordingly, the problem to be solved by the present invention is to provide a method of easily obtaining a polyimide solution. Further, it is an object of the invention to provide a fluorinated polyimide solution from which fluorinated polyimide particularly excellent as an optical material and an electronic functional material can easily be produced.

The inventors of the invention have made intensive investigations on the conditions under which a polyimide solution can be obtained at a high efficiency to satisfy the above-mentioned problems. Consequently, the inventors of the invention have found that a polyimide solution with a high viscosity can easily be obtained by promoting reaction while mixing raw material compounds by a rotation-revolution type mixing method in the case of producing polyimide from a polyamide acid by a chemical method, and accordingly have accomplished the invention.

A production method of a soluble polyimide solution of the invention is characterized by mixing a mixture containing a polyamide acid, a cyclodehydration reagent and a solvent by a rotation-revolution type mixing method.

As the above-mentioned cyclodehydration reagent, tertiary amines and combinations of tertiary amines and carboxylic acid anhydrides are preferable. It is because a polyimide solution with a high concentration and a high viscosity can be obtained at a particularly high efficiency. Also, the polyamide acid to be used is preferably a compound defined by the following formula (I). It is because a polyimide solution excellent as an optical material can be obtained.

(I)

wherein, X and Y independently represent divalent organic groups; Z represents chlorine, bromine, or iodine; p represents an integer of 1 to 3; q represents an integer of 0 to 2; and p+q=3.

The viscosity of the soluble polyimide solution of the invention is preferably 1 Pa·S or higher. It is because as the concentration or the viscosity is higher, polyimide with a thick film thickness can more efficiently be produced.

Further, the inventors of the invention have made intensive investigations on a technique of easily producing fluorinated polyimide with a little light transmission loss and consequently have found that fluorinated polyimide having a specified structure and not produced by firing through high temperature has a high solubility in a solvent and if its solution is used, the aim of the invention can be attained. Accordingly, the inventors have accomplished the invention.

A fluorinated polyimide solution of the invention is a solution of polyimide defined by the following formula (II) and excellent as an optical material.

(II)

wherein, definitions of X, Y, Z, p and q are same as those described above.

The viscosity of the above-mentioned polyimide solution is also preferable to be 1 Pa·S or higher.

Further, a production method of an optical waveguide of the invention comprises steps of forming a clad layer or a core layer or a core itself using the fluorinated polyimide solution of the invention. That is, the fluorinated polyimide solution of the invention is applied on a substrate or a clad layer and then the solvent is removed, or the fluorinated polyimide solution of the invention is inserted into groove formed in a clad and then the solvent is removed to form the clad layer, the core layer or the core itself of polyimide.

Also, an optical waveguide of the invention is produced by the above-mentioned method. The optical waveguide is preferable to have a core of polyimide. In the case of forming the core of the optical waveguide by using the fluorinated polyimide solution of the invention, it is sufficient to simply remove the solvent without requiring heating at a high temperature which is required in conventional cases, and therefore the light transmission loss in a wavelength necessary for light transmission at the core itself or the clad can be suppressed. Further, unlike conventional methods in which long time heating at a low temperature is carried out so as to avoid such the light transmission loss, the molecular weight decrease of polyimide is not caused.

DESCRIPTION OF THE PREFERRED EMBODIMENTS

A production method of a polyimide solution of the invention is characterized in that a mixture containing a polyamide acid, a cyclodehydration reagent and a solvent is mixed by a rotation-revolution mixing method. That is, a production method of a polyimide solution of the invention comprises a step of mixing a mixture containing a polyamide acid, a cyclodehydration reagent and a solvent by a rotation-revolution mixing method.

On the contrary to the method of the invention, in conventional chemical polyimidation, it has been difficult to evenly mix a polyamide acid, a cyclodehydration reagent in a solvent o quickly carry out reaction, since the viscosity is too high. On the other hand, if the solvent amount is increased to lower the viscosity, the waste solution amount is increased. Accordingly, a method of simply mixing and stirring indispensable components is unsuitable for mass production of a huge amount of a polyimide solution. Further, a conventional production method of a polyimide product by heating a polyamide acid solution with high temperature causes the deterioration of a product quality by high temperature, and therefore the method is unsuitable for producing an optical material. If the heating temperature is lowered, the molecular weight of polyimide to be obtained is lowered and only a product inferior in the strength is obtained.

According to the method of the invention, a polyamide acid and a cyclodehydration reagent can easily and quickly be mixed in a solvent, and simultaneously polyimidation can be carried out. Consequently, a polyimide solution with a high viscosity can be efficiently obtained by using a small amount of solvent. The polyimide solution obtained by the method of the invention is suitable for obtaining a polyimide product by heating at a temperature proper for removing the solvent and therefore, a product with high quality can be obtained. Further, the deterioration of strength of he obtained polyimide product attributed to decreasing the molecular weight of polyamide acid can be hardly caused.

The polyamide acid to be used in the invention is a polyamide acid of the following general formula and is not particularly limited, however it is required to be at least a precursor of a soluble cyclic polyimide.

wherein, $R^1$ represents a tetravalent organic group and $R^2$ represents a divalent organic group.

As the polyamide acid, a compound defined by the following formula (I) is preferable. It is because polyimide excellent as an optical material and an electronic functional material can be produced from the compound.

(I)

wherein definitions of X, Y, Z, p and q are same as those described above.

X represents a divalent organic group and examples are as follows:

the following aryl groups the above exemplified aryl groups may be substituted with substituent (s) selected from a group consisting of halogen atom, methyl group, and trifluoromethyl;

the following aryloxy groups the above exemplified aryloxy groups may be substituted with substituent(s) selected from a group consisting of halogen atom, methyl group, and trifluoromethyl; and the following arylthio groups the above exemplified aryl groups may be substituted with substituent(s) selected from a group consisting of halogen atom, methyl group, and trifluoromethyl.

Among them, an aryloxy group or an arylthio group is preferable, and aryloxy groups are more preferable.

In the above examples, examples of a halogen atom as a substituent is a fluorine atom, a chlorine atom, a bromine atom and an iodine atom, and a fluorine atom or a chlorine atom is preferable, and a fluorine atom is even more preferable. In the case where there is a plurality of substituent groups, the substituents may be same or different. Preferable substituent is a fluorine atom and/or a trifluoromethyl group, and a fluorine atom is even more preferable.

X is preferable to be the following groups wherein, $W^1$ and $W^2$ independently represent an oxygen atom or a sulfur atom. In this case, $W^1$ and $W^2$ are preferable to be the same, that is, both of $W^1$ and $W^2$ are preferably oxygen atoms or sulfur atoms, and more preferably oxygen atoms.

The kind of Y, a divalent organic group, is not particularly limited, and following groups can be exemplified.

In the above-mentioned exemplified groups, if they are substitutable, they may be substituted with substituents selected from a group consisting of a halogen atom, a methyl group and a trifluoromethyl. The halogen atom is preferably a fluorine atom or a chlorine atom and a fluorine atom is even more preferable. In the case where there is a plurality of substituent groups, the types of the substituent groups may be same or different. Preferable substituent groups are a fluorine atom and/or a trifluoromethyl group, and a fluorine atom is even more preferable.

In the compound (I), p represents an integer of 1 to 3; q represents an integer of 0 to 2; and p and q satisfy p+q=3. Preferable compound (I) is a compound in which p is 3, in other words, a compound completely substituted with fluorine atoms.

The cyclodehydration reagent to be used in the invention can be any reagent without particular limits if they have functions of chemically dehydrating and cyclizing a polyamide acid and producing polyimide. Examples of the cyclodehydration reagent may be tertiary amines such as trimethylamine, triethylamine, tripropylamine, tributylamine, pyridine, 1,4-diazabicyclo[2,2,2]octane (abbreviated as DABCO), 1,8-diazabicyclo[5,4,0]undeca-7-ene, 1,5-diazabicyclo[4,3,0]nona-5-ene, N,N,N',N'-tetramethyldiaminomethane, N,N,N',N'-tetramethylethylenediamine, N,N,N',N'-tetramethyl-1,3-propanediamine, N,N,N',N'-tetramethyl-1,4-phenylenediamine, N,N,N',N'-tetramethyl-1,6-hexanediamine, N,N,N',N'-tetraethylmethylenediamine and N,N,N',N'-tetraethylethylenediamine; and carboxylic acid anhydrides such as acetic anhydride, trifluoroacetic anhydride, propionic anhydride, butyric anhydride, isobutyric anhydride, succinic anhydride and maleic anhydride. As a tertiary amine, pyridine, DABCO and N,N,N',N'-tetramethyldiaminomethane are preferable, and DABCO is particularly preferable. As a carboxylic acid anhydride, acetic anhydride and trifluoroacetic anhydride are preferable, and acetic anhydride is particularly preferable. With respect to these tertiary amine and carboxylic acid anhydride, the tertiary amine may be used alone, or the tertiary amine and the acid anhydride may be used in combination.

The solvent to be used in the invention is preferably a polar solvent excellent in solubility. Examples are N,N-dimethylacetamide, N,N-dimethylformamide, N-methylpyrrolidone and dimethyl sulfoxide.

In the method of the invention, at first a mixture containing a polyamide acid, a cyclodehydration reagent and a solvent is produced. The mixture may be a homogenous solution or suspension.

The concentration of the polyamide acid in the mixture is a concentration proper to suppress polyimide precipitation at room temperature at the time of obtaining polyimide finally. On the other hand, it is preferable that the concentration is adjusted to be as high as possible. It is because the concentration and the viscosity of the polyimide solution to be obtained can be heightened and a polyimide product can efficiently and simply be produced. From such a viewpoint, the polyamide acid concentration in the mixture is preferable to be 5% by mass or higher, more preferably 10% by mass or higher, and a practical concentration may be determined according to preliminary experiments.

The addition amount of the cyclodehydration reagent can be determined in accordance with the addition amount of the polyamide acid by a known technique. For example, the addition amount of tertiary amine is 0.005 to 0.3 equivalents, preferably 0.01 to 0.2 equivalents to 1 equivalent of amide unit of the polyamide acid. It is because if the reagent is added in an amount less than 0.005 equivalent, the effect as a catalyst may possibly insufficient, and even if the reagent is added in an amount exceeding 0.3 equivalent, the effect may possibly be saturated. The addition amount of a carboxylic acid anhydride is 1 to 20 equivalents, preferably 1.1 to 15 equivalents also to 1 equivalent of amide unit of the polyamide acid. It is because if it is less than 1 equivalent, amide bonds remain and the effect as dehydration agent may be possibly exerted sufficiently and if it exceeds 20 equivalents, the effect may possibly saturated.

The method of preliminarily mixing the above-mentioned the polyamide acid, the cyclodehydration reagent and the solvent to give the mixture is not particularly limited. For example, a cyclodehydration reagent may be added direction to a mixture of a polyamide acid and a solvent, which includes a solution, or the solution of a cyclodehydration reagent may be added. Also, in the case of using a tertiary amine and a carboxylic acid anhydride in combination as a cyclodehydration reagent, the addition order is not particularly limited. For example, a tertiary amine and a carboxylic acid anhydride may be added at once or one of them may be added to a polyamide acid and a solvent and mixed properly by a rotation-revolution mixing method and after that, the other may be added and mixed further.

In the method of the invention, the above-mentioned mixture is mixed by the rotation-revolution mixing method to carryout polyimidation. At that time, mixing may be carried out at room temperature, and the mixture may be heated previously to a temperature of around 100° C. or lower. In this connection, in the case of synthesis in a large quantity, to avoid uneven temperature increase, heating should not be carried out beyond necessity.

The rotation-revolution mixing method employed in the invention is a method for mixing an object or defoaming or degassing by applying rotation movement and revolution movement to the object. The mixture of the invention can efficiently be mixed within a short time by the mixing method, so that the raw material compound can be brought into contact with one another and uneven polyimidation can be suppressed and high polyimidation can be achieved. Further, since defoaming and degassing can be carried out simultaneously, a polyimide solution free from inclusion of foams can be obtained.

Mixing by the rotation-revolution mixing method can be carried out using a commercialized apparatus or an apparatus newly manufactured in accordance with scale. The requirement which the apparatus for performing the rotation-revolution mixing method has to satisfy is to give rotating movement and revolving movement to a container into which at least the mixture of the invention is inserted. The rotation face and the revolution face may be parallel, however to lessen the load on the apparatus, both faces may be arranged at a certain angle between them. For example, an angle of about 10 to 80° may be formed between them.

The rotation speeds of the rotation movement and the revolution movement are preferably in a range of 0.1 to 5000 rpm. The rotation speeds of the rotation movement and the revolution movement may be same or different. The respective rotation speeds may be changed to carry out stirring periodically. For example, aiming stirring as a main purpose, mixing may be carried out at a rotation speed of 10 to 2000 rpm and a revolution speed of 100 to 3000 rpm, and then aiming degassing as a main purpose, mixing may be carried out at a rotation speed of 0 to 1000 rpm and a revolution speed of 100 to 3000 rpm. The practical conditions may be determined according to the practical production method scale or the like.

The mixing time is not particularly limited, and since mixing is promoted extremely efficiently by the rotation-revolution mixing method even if the viscosity of the mixture is high, it may be set to be 1 to 30 minutes. Practical mixing time may be determined according to preliminary experiments.

As described above, a soluble polyimide solution with a high concentration and high viscosity can easily and efficiently be obtained. For example, although it depends on the solubility of the soluble polyimide to be an object, it is made possible to produce even a soluble polyimide solution with a concentration of 30% by mass or higher, which is difficult to be produced by conventional techniques. Also, it is made possible to efficiently produce a soluble polyimide solution with a viscosity of 1 Pa·S or higher, which is difficult to be mixed and stirred by conventional techniques.

The viscosity of the polyimide solution to be produced by the method of the invention is preferably 3 Pa·S or higher and more preferably 5 Pa·S or higher. It is because as the viscosity is higher, a thick polyimide film can be obtained more easily and thus the solution has higher usability. Further, it is generally difficult for a conventional method involving solving polyimide powder in a solvent to easily produce polyimide solution with a high viscosity, and therefore, at a point of this condition, the production method of the invention is apparently different from conventional techniques.

A fluorinated polyimide solution of the invention is a solution of fluorinated polyimide defined by the following formula (II). The polyimide is characterized by its high heat resistance and low light transmission loss particularly in an optical communication wavelength region. Accordingly, incase where the fluorinated polyimide solution of the invention is used, it is made possible to produce polyimide excellent particularly as an optical material.

(II)

wherein, definitions and practical examples of X, Y, Z, p and q are same as those described in the definitions of the compound (I).

To deal with a rapid increase of a communication intelligence quantity in these years, polyimide with further decreased waveguide loss has been desired. However, according to conventional techniques, since polyimidation is carried out from a polyamide acid solution by heating at a high temperature, for example 250 to 400° C., for removing the solvent and firing it, the deterioration of a quality is caused. Therefore, it has been tried to produce a polyimide product from the polyimide solution by solving polyimide fired at high temperature by a conventional technique, however it is impossible to dissolve the polyimide produced by heating and firing the polyamide acid solution.

The inventors of the invention have made various investigations and consequently have found that the fluorinated polyimide defined by the formula (II) and obtained from a polyamide acid without heating and firing step at high temperature of 250 to 400° C. can be dissolved in a solvent easily. In the case of producing a polyimide product such as a polyimide film from the fluorinated polyimide solution of the invention, it is sufficient to remove the solvent alone, and therefore it is made possible to obtain a high quality product with suppressed coloration and a little light transmission loss.

A production method of the solution of the fluorinated polyimide defined by the formula (II) is not particularly limited, however at least a step of removing solvent and firing at high temperature is unnecessary. It is because polyimide produced through the step is insoluble in a solvent. For example, a polyimide solution is produced by properly heating a solution of a corresponding polyamide acid while keeping solution condition, and then the solution is added to a poor solvent to precipitate and obtain polyimide powder, and the powder may be dissolved again in a solvent. At the time of the re-dissolution, a rotation-revolution mixing method is preferably employed since the method gives a solution with a high viscosity at a high efficiency.

Regardless of the above description, the fluorinated polyimide solution of the invention is preferable to be produced by the production method of the polyimide solution of the invention. It is because even the solution with high viscosity can be produced efficiently. Further, to remove the cyclodehydration reagent, the fluorinated polyimide solution of the invention obtained by the production method of the invention may be added to a poor solvent to obtain a polyimide powder, and the powder is dissolved again.

The solvent to be used for the fluorinated polyimide solution of the invention is not particularly limited if it can dissolve the fluorinated polyimide therein. Examples may be amide type solvents such as N,N-dimethylacetamide, N,N-dimethylformamide and N-methylpyrrolidone; dimethyl sulfoxide; ketone type solvents such as acetone, methyl ethyl ketone and 2-pentanone; and ester type solvents such as methyl formate, ethyl formate, propyl formate, butyl formate, methyl acetate, ethyl acetate, propyl acetate, isopropyl acetate, butyl acetate, methyl propionate, ethyl propionate and butyl propionate. Since amide type solvents such as N,N-dimethylacetamide and dimethyl sulfoxide have high solubility to the fluorinated polyimide, they are preferable. In the case of obtaining a polyimide product with less coloration and lower light transmission loss by controlling a temperature at the time of removing a solvent, solvents having lower boiling points such as the above-mentioned ketone type solvents and ester type solvents may be used.

The concentration of the fluorinated polyimide solution of the invention is not particularly limited, however since the temperature and the time at the time of removing the solvent can be decreased more as the concentration is higher, it is preferable to be 5% by mass or higher, more preferably 10% by mass or higher. The viscosity of the solution is also not particularly limited, however because of easiness of production of a thick polyimide film, it is preferably 1 Pa·S or higher, more preferably 3 Pa·S or higher, and even more preferably 5 Pa·S or higher.

Use of the fluorinated polyimide solution of the invention makes it possible to produce polyimide at a lower temperature than that in the case of using a conventional polyamide acid solution, and therefore the polyimide to be produced is a high quality product with suppressed coloration and a little light transmission loss as compared with conventionally produced polyimide. The property of low light transmission loss is particularly preferable property in the case of using polyimide as an optical material. Use of the fluorinated polyimide solution of the invention makes it possible to produce polyimide having light transmission loss of 3.5 dB/cm or lower, more preferably 1.5 dB/cm and even more preferably 1 dB/cm in wavelength region of, for example, 830 nm, 850 nm, 1310 nm and 1550 nm.

Figure 1:
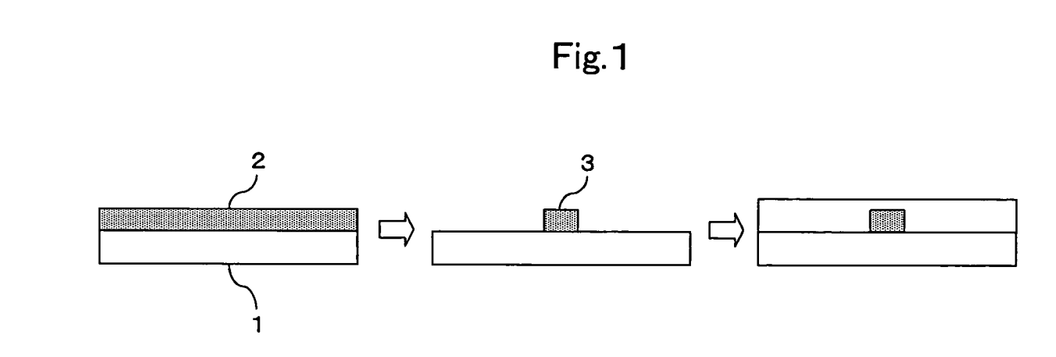
FIG. 1 is a schematic drawing showing process of producing an optical waveguide.

An optical waveguide of the invention comprises a clad layer or a core layer, or a core itself produced by using the fluorinated polyimide solution of the invention. For example, in the case where the core is produced from the fluorinated polyimide solution of the invention, it can be produced by the method shown in FIG. 1. First, the fluorinated polyimide solution of the invention is cast on a clad film 1 made of a resin having a different light refractive index, and heated to remove the solvent to laminate a core layer 2 of polyimide. The heating temperature in this case is not necessary to be so high, unlike that in a conventional case, since the temperature is sufficient if the solvent is removed, and accordingly the quality is not deteriorated by the heating at a high temperature. Next, the core layer 2 is etched to form a core 3 and a clad film is further laminated. In the case where the clad layer is formed using the fluorinated polyimide solution of the invention, the solution is cast on a substrate at first and then the solvent is removed and successively a core is formed using another resin and the clad layer is formed again using the fluorinated polyimide solution of the invention.

In the case where the core itself is produced directly from the fluorinated polyimide solution of the invention, the fluorinated polyimide solution of the invention is inserted into a groove formed in a clad, and then the solvent is removed. This method does not involve core formation by etching and thus simple. Further, since the method does not require high temperature process, coloration can be suppressed and a waveguide with low waveguide loss can be obtained. Hereinafter, a production method of an optical waveguide of the invention will be described with reference to FIG. 2.

Figure 2:
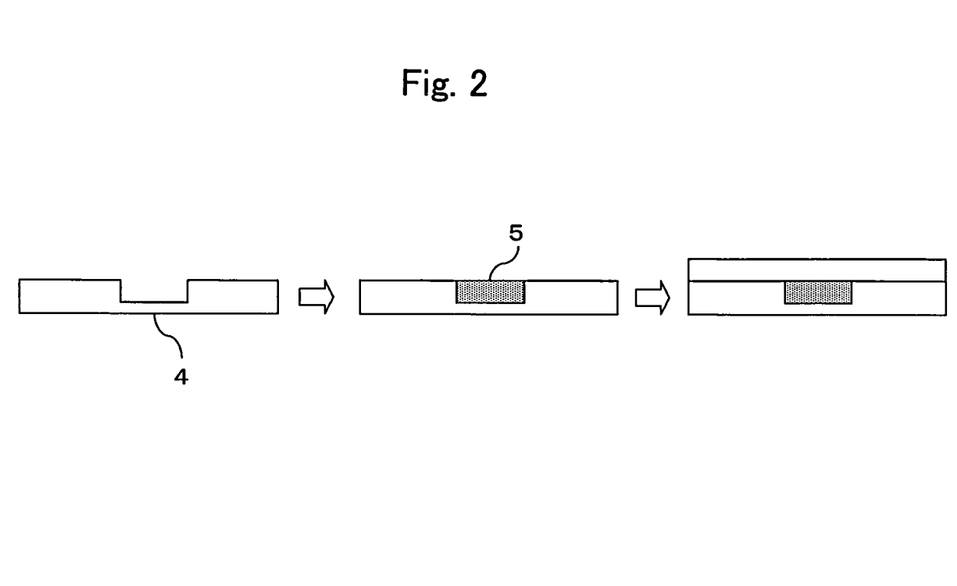
FIG. 2 is another schematic drawing showing process of producing an optical waveguide.

First, a resin with a lower refractive index than that of polyimide, which is a core material, is used for forming a clad 4. Preferably, a resin such as a thermosetting resin, a two-component resin, and a light-curable resin such as a UV-curable resin, excellent in moldability may be used, and a light-curable resin such as a UV-curable resin is more preferably used among them. These resins may be used in the condition of solutions or without solvents. As these resins, an epoxy resin, an oxetane resin, an acrylic resin, and polyimide resin are exemplified.

UV-curable resin or a thermosetting resin excellent in moldability may be used.

A groove for forming a core is formed in the clad. Groove formation may be carried out by a commonly known method. For example, a solution of a resin for forming the clad or a mixed solution of a resin and a curing agent in the case of using an epoxy resin is poured in a frame, and cured while a groove frame is immersed therein.

Next, the fluorinated polyimide solution of the invention is injected into a groove and cured to form the core 5. The curing can be carried out at a relatively low temperature since it is carried out only by removing the solvent, and therefore the curing does not cause coloration. Further, since no treatment at temperature as high as that in the case of conventional polyimidation is needed, a resin relatively weak to heat may be usable as a clad material. The heating temperature may properly be adjusted in accordance with the solvent to be used and it is generally about 100 to 200° C. The curing time may also be adjusted properly and it is generally about 1 to 12 hours.

Then, a clad is layered to obtain an optical waveguide. The material of the clad may be any material if it has a lower refractive index than polyimide, and is not necessarily same as the material of the lower clad. Preferably, a similar material to that of the clad material in which a groove for the core is formed may be used.

Since the optical waveguide obtained in the above-mentioned manner is not exposed to a high temperature unlike a conventional one, the waveguide has high quality with suppressed coloration and a little waveguide loss. Unlike a conventional method, since the molecular weight of the polyamide acid is not lowered at the time of polyimidation, the obtained optical waveguide is excellent in strength.

This application is based on Japanese Patent Application No. 2005-069702 filed on Mar. 11, 2005, the content of which is hereby incorporated by references.

The invention and objects and features thereof will be more readily apparent from the following examples, however it is not intended that the invention be limited to the illustrated examples. Modifications and substitutions to specific process conditions and structures can be made without departing from the spirit and scope of the invention.

EXAMPLES

Production Example 1-1

Production of Polyamide Acid Solution

To a 100 mL three neck flask, 1,3-Diamino-2,4,5,6-tetrafluorobenzene (4.48 g, 24.92 mmol), 4'-[(2,3,5,6-tetrafluoro-1,4-phenylene)bis(oxy)](3,5,6-trifluorophthalic anhydride) (14.51 g, 24.92 mmol), and N,N-dimethylacetamide (31 g) were charged. The mixed solution was stirred at room temperature in nitrogen atmosphere to obtain a homogenous solution, and then was kept still for 4 days to obtain a polyamide acid solution. The viscosity of the obtained solution was measured by a viscometer (RC 20-CPS, manufactured by Rheotech Co., Ltd.) to find it was 16.0 Pa·S.

Production Example 1-2

Production of Polyimide Solution

The polyamide acid solution (20 g) obtained in the above Production Example 1-1 was transferred to a 100 mL container made of polypropylene. To the solution, further 1,4-diazabicyclo[2,2,2]octane (0.03 g, 0.27 mmol) and acetic anhydride (2.0 g, 19.59 mmol) was added, and the mixture was stirred by a rotation-revolution mixer (AR-250, Thinky Co., Ltd.) in a stirring mode for 10 minutes and in a defoaming mode for 5 minutes to carry out rapid mixing. Then the mixture was kept still for 24 hours to carry out imidation. At that time, the revolution speed was 2,000 rpm and the rotation speed was 800 rpm in the stirring mode, and the revolution speed was 2,200 rpm and the stirring speed was 60 rpm in the defoaming mode. The sample holder was slanted at 45° to the rotation axis.

The viscosity of the obtained polyimide solution was measured in the same manner as the above Production Example 1-1 to find it was 18.0 Pa·S. The solution was seemed to be homogenous and free from foam inclusion by eye observation. Further, imidation ratio was observed by $^1$H-NMR to find that no peak attributed to carboxyl group derived from a raw material, polyamide acid, existed, proving that quantitative polyimidation was carried out. Further, no peak attributed to the polyamide acid was observed by $^{19}$F-NMR. From the results of the Example, it was proved that the homogenous polyimide solution free from foam inclusion and having a viscosity as high as 18.0 Pa·S could be obtained by the invention.

Production Example 2-1

Production of Polyamide Acid Solution

To a 100 mL three neck flask, 2,2'-Bis(trifluoromethyl)-4,4'-diaminobiphenyl (4.83 g, 15.67 mmol), 4,4'-[(2,3,5,6-tetrafluoro-1,4-phenylene)bis(oxy)](3,5,6-trifluorophthalic anhydride) (8.77 g, 15.07 mmol), and N,N-dimethylacetamide (66.4 g) were charged. The mixed solution was stirred at room temperature in nitrogen atmosphere to obtain a homogenous solution, and then was kept still for 2 days to obtain a polyamide acid solution. The viscosity of the obtained solution was measured in the same manner as the above Production Example 1-1 to find it was 19.5 Pa·S.

Production Example 2-2

Production of Polyimide Solution

The polyamide acid solution (45 g) obtained in the above Production Example 2-1 was transferred to a 100 mL container made of polypropylene. To the solution, further acetic anhydride (3.5 g, 34.28 mmol) was added, and the mixture was stirred by a rotation-revolution mixer (AR-250, Thinky Co., Ltd.) in a stirring mode for 1 minute. After that, 1,4-diazabicyclo[2,2,2]octane (0.03 g, 0.27 mmol) was added, and the resulting mixture was stirred similarly by the rotation-revolution mixer in a stirring mode for 10 minutes and in a defoaming mode for 1 minute to carryout rapid mixing. Then the mixture was kept still for 24 hours to carry out imidation. At that time, the conditions such as the revolution speed, the rotation speed, and the like were controlled to be the same as those of Production Example 1-2. The viscosity of the obtained polyimide solution was measured in the same manner as the above Production Example 1-1 to find it was 19 Pa·S.

Comparative Production Example 1

Production of Polyimide Solution

According to a method of Example of a prior technique disclosed in Japanese Unexamined Publication No. 3-62868, a polyimide solution was produced. Practically, a commercialized partially fluorinated polyamide acid solution (FLUPI-01, manufactured by Central Glass Co., Ltd.) was transferred to a 1000 mL tray. The solution was air-dried at 70° C. for 12 hours and further heated at 200° C. for 1 hour to carry out solvent removal and simultaneous polyimidation. The obtained polyimide powder was scraped and dissolved in N,N-dimethylacetamide to produce a polyimide solution.

Comparative Production Example 2

Production of Polyimide Solution

The polyamide acid obtained in the Production Example 1-1 was subjected to heating treatment in the same conditions as those of Comparative Production Example 1 to produce a polyimide solution. The imidation ratio of the obtained polyimide solution was measured by $^1$H-NMR to find that it was about 75%, utterly insufficient.

Test Example 1

Molecular Weight Measurement

The polyamide acid solutions obtained in Production Examples 1-1 and 2-1 and polyimide solutions obtained in Production Example 1-2 and Production Example 2-2 were subjected to molecular weight measurement of polyamide acids and polyimides, respectively. Gel permeation chromatograph SC 8020 manufactured by Tosoh Corporation was used as a measurement apparatus. The results are shown in Table 1. In Table 1, "Mw" means the weight average molecular weight and "Mn" means the number average molecular weight measured by polystyrene conversion.

TABLE 1

|  | Production Example 1-1 (polyamide acid) | Production Example 1-2 (polyimide) | Production Example 2-1 (polyamide acid) | Production Example 1-2 (polyimide) |
|---|---|---|---|---|
| Mw | 57064 | 57981 | 200548 | 186381 |
| Mn | 27621 | 27463 | 129086 | 113262 |

According to the above results, with respect to the polyimide solution according to the invention, it was proved that the molecular weights of the polyimides were scarcely decreased.

Also, the polyamide acids and polyimides of Comparative Production Examples 1 and 2 were subjected to the same measurement. The results are shown in Table 2.

TABLE 2

|  | Comparative Production Example 1 (polyamide acid) | Comparative Production Example 1 (polyimide) | Production Example 1-1 (polyamide acid) | Comparative Production Example 2 (polyimide) |
|---|---|---|---|---|
| Mw | 390695 | 19058 | 90012 | 15489 |
| Mn | 255950 | 27463 | 47981 | 5556 |

According to the results shown in Table 2, with respect to the polyimide solutions obtained by conventional method, a considerably significant decrease of the molecular weight was observed. Generally, a weight average molecular weight of 30,000 or higher is said to be necessary to produce a film, and therefore, polyimide films produced from the polyimide solutions obtained by conventional method are supposed to be extremely insufficient in the strength in some cases.

Production Example 3

Production of Polyimide Film

The polyimide solution produced in the above Production Example 1-2 was cast on a glass plate previously coated with a separation agent using an applicator. After that, heating treatment was carried out at 175° C. for 5 hours in an oven to remove the solvent. As a result, a homogenous thick film of polyimide having a thickness of 60 μm and free from foam inclusion was obtained.

Production Example 4

Production of Polyimide Film

The polyimide solution (20 g) produced in the above Production Example 2-2 was diluted two times with acetone, and then slowly added dropwise to a mixed solution of methanol and water at 1:1. The obtained precipitate was filtered to obtain polyimide powder. The polyimide powder was dissolved again in acetone, and the solution was slowly added dropwise to a mixed solution of methanol and water at 1:1. The precipitated polyimide was separated by filtration and dried at 70° C. over night by a vacuum drying apparatus to obtain a polyimide powder with a high purity.

The polyimide powder (6.9 g) was dissolved in acetone (7.6 g) to produce a polyimide solution with a concentration of about 48% by mass. The solution was cast on a glass plate previously coated with a separation agent using an applicator. After that, heating treatment was carried out at 65° C. for 4 hours in an oven to remove the solvent. As a result, an homogenous thick film of polyimide having a thickness of 75 μm and free from foam inclusion was obtained.

Production Example 5

Production of High Purity Polyimide Solution

The polyimide solution (20 g) produced in the above Production Example 1-2 was diluted two times with acetone (20 g), and then slowly added dropwise to a mixed solution of methanol and water at 1:1 to precipitate polyimide powder. The obtained polyimide powder was separated by filtration and then dried at 70° C. over night by a vacuum drying apparatus to obtain polyimide powder. The polyimide powder was further dissolved again in acetone (20 g). The resulting solution was slowly added dropwise to a mixed solution of methanol and water at 1:1 to obtain a polyimide powder in the same manner. The obtained polyimide powder was dried at 70° C. over night by a vacuum drying apparatus to obtain polyimide powder with a high purity from which the cyclodehydration reagent or the like was removed. The polyimide powder (9 g) was dissolved in dimethylacetamide (21 g) to produce a high purity polyimide solution with a concentration of 30% by mass.

Production Example 6-1

Production of Polyamide Acid Solution

To a 100 mL three neck flask, 1,3-diamino-3-chloro-2,4,6-trifluorobenzene (4.16 g, 21.19 mmol), 4,4'-[(2,3,5,6-tetrafluoro-1,4-phenylene)bis(oxy)](3,5,6-trifluorophthalic anhydride) (12.34 g, 21.19 mmol), and N,N-dimethylacetamide (33.5 g) were charged. The mixed solution was stirred at room temperature in nitrogen atmosphere to obtain a homogenous solution, and was kept still for 4 days to obtain a polyamide acid solution.

Production Example 6-2

Production of Polyimide Solution

The polyamide acid solution (20 g) obtained in the above Production Example 6-1 was transferred to a 100 mL container made of polypropylene. To the solution, further 1,4-diazabicyclo[2,2,2]octane (0.01 g, 0.12 mmol) and acetic anhydride (2.1 g, 20.35 mmol) were added. The mixture was subjected to polyimidation using a rotation-revolution mixer (AR-250, Thinky Co., Ltd.) in the same conditions as those in Production Example 1-2.

With respect to the obtained polyimide solution, the imidation ratio was observed by $^1$H-NMR to find that no peak attributed to carboxyl group derived from a raw material, polyamide acid, existed, proving that quantitative polyimidation was carried out. Further, no peak attributed to the polyamide acid was observed also by $^{19}$F-NMR. The polyimide solution was seemed to be homogenous and free from foam inclusion by eye observation.

Production Example 6-3

Production of Polyimide Solution

The polyimide solution (20 g) produced in the above Production Example 6-2 was used to produce a polyimide solution with a concentration of 30% by mass and having higher purity, according to the same method as Production Example 5.

Production Example 7

Production of Slab Type Optical Waveguide using Solution of the Invention

The high purity polyimide solution obtained in the Production Example 6-3 was applied on a synthetic quartz substrate with a size of 10 mm width×50 mm length×1 mm thickness. The substrate was heated at 150° C. for 10 hours in an oven to remove the solvent to produce a slab type waveguide sample comprising a core with a thickness of 5 μm, a polyimide film layer, and a clad, the quartz substrate of a thickness of 1 mm.

Comparative Production Example 3

Production of Slab Type Optical Waveguide using Conventional Polyamide Acid Solution Although it was tried to produce an optical waveguide from the polyamide acid solution obtained in Production Example 6-1 in the same conditions as described in Production Example 7, many cracks were formed in a film to make the production impossible. It was supposed to be because polyamide chains were cut to lessen the molecular weight by heating at a relatively low temperature, 150° C., for a long time.

Therefore, it was tried to produce a waveguide in the same conditions as those of Production Example 7, except that heating was carried out at a temperature of 320° C. for 1 hour. As the result, an optical waveguide could be produced.

Test Example 2

Test of Waveguide Loss of Slab Type Optical Waveguide

The waveguide loss of the optical waveguide produced in Production Example 7 was measured by a prism sliding method. That is, laser beam with wavelength of 830 nm was introduced into the optical waveguide of Production Example 7 and waveguide loss was measured by prism coupler & loss measurement, SPA-400, manufactured by Sairon Technology, Inc.

The measurement result was that the waveguide loss of the optical waveguide of Production Example 7 of the invention was 0.34 dB/cm at 830 nm. The optical waveguide of the invention was thus found having a low waveguide loss and a very good quality.

Production Example 8

Production of Ridge Type Optical Waveguide using Solution of the Invention

A commercialized UV resin for optical use (E 3345, manufactured by NTT-AT) was applied on a commercialized polyimide substrate (thickness of 0.7 mm, diameter of 4 inch, manufactured by NTT-AT). To the substrate, UV of 365 nm was radiated at 10 mW/cm$^2$ dose for 15 minutes using a very high pressure mercury lamp to form a 15 μm-thick lower part clad layer.

Further, the polyimide solution of Production Example 6-3 was applied on the lower part clad layer to form an 8 μm-thick core layer by heating at 200° C. for 1 hour. Next, a rectangular core was formed by photolithography and reactive ion etching, O$_2$-RIE.

The above-mentioned UV resin, E 3345, was applied on the core and similar UV radiation treatment was carried out to form an 8 μm-thick upper part clad layer by heating at 100° C. for 6 hours.

After that, a ridge type waveguide with a core size of 8×8 μm and a waveguide length of 50 mm was produced by cutting with a dicing saw (DAD 321, manufactured by Disco Corporation).

Comparative Production Example 4

Production of Ridge Type Optical Waveguide using Conventional Polyamide Acid Solution The polyamide acid solution of Production Example 1-1 was applied on a polyimide substrate (thickness of 0.7 mm, diameter of 4 inch, manufactured by NTT-AT), and the substrate was heated at 320° C. for 1 hour to form a 15 μm-thick lower part clad layer.

Further, the polyamide acid solution of Production Example 6-3 was applied on the lower part clad layer to form an 8 μm-thick core layer by heating at 320° C. for 1 hour. Next, a rectangular core was formed by photolithography and dry etching using O$_2$-RIE. The polyamide acid solution of Production Example 1-1 was applied on the core and heated at 320° C. for 1 hour to form an 8 μm-thick upper part clad layer.

After that, a ridge type waveguide was produced in the same manner as Production Example 7.

Test Example 3

Test of Waveguide Loss of Ridge Type Optical Waveguide

Figure 3:
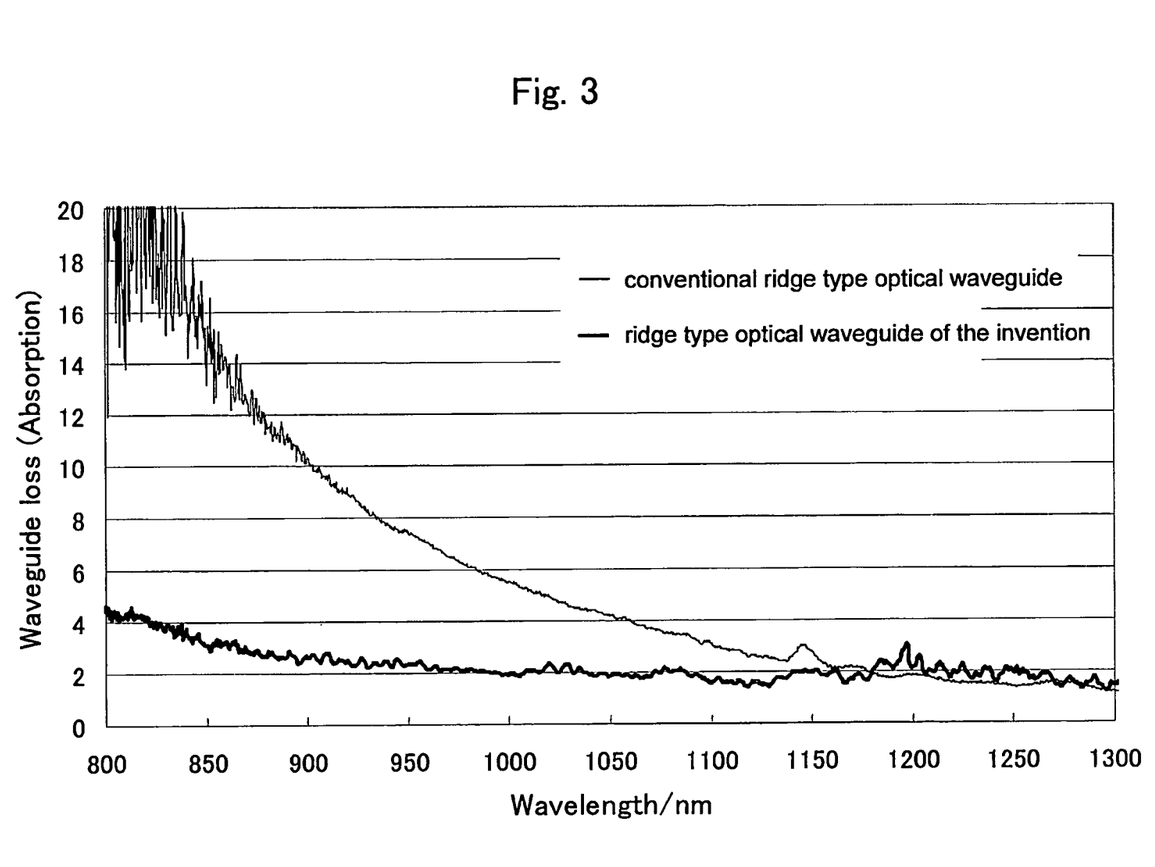
FIG. 3 is a graph showing the correlation between wavelength of coming light and waveguide loss (absorption) in a ridge type optical waveguide of the invention and in a conventional ridge type optical waveguide.

With respect to the ridge type optical waveguides produced in Production Example 8 and Comparative Production Example 4, incandescent light rays were introduced into the optical waveguides with 50 mm length by using incandescent light source (AQ4305, manufactured by Yokogawa Electric Corporation, and the waveguide loss was measure by using a spectrum analyzer (AQ6317, manufactured by Yokogawa Electric Corporation). The correlation between the wavelength of the introduced light rays and the waveguide loss, absorption, is shown in FIG. 3. The waveguide loss of the optical waveguide of Production Example 8 of the invention was 3.1 dB at a specified wavelength of 850 nm. Meanwhile, the waveguide loss of the optical waveguide produced in Comparative Production Example 4 of the invention was 15.37 dB at 850 nm, about 5 times as much as that of the optical waveguide of the invention. It was found that the optical waveguide of the conventional optical waveguide produced with such high temperature as 320° C. has a high waveguide loss at wavelength necessary for light transmission. On the other hand, the optical waveguide of the invention has a much lower waveguide loss as compared with the conventional optical waveguide and high quality.

Production Example 9

Production of Polyimide Film

A polyimide solution produced in Production Example 5 was applied on a silicon substrate, and heated at 350° C. for 10 hours to obtain a polyimide film with a thickness of about 0.02 mm. The photograph of the obtained polyimide film is shown as FIG. 4.

Figure 4:
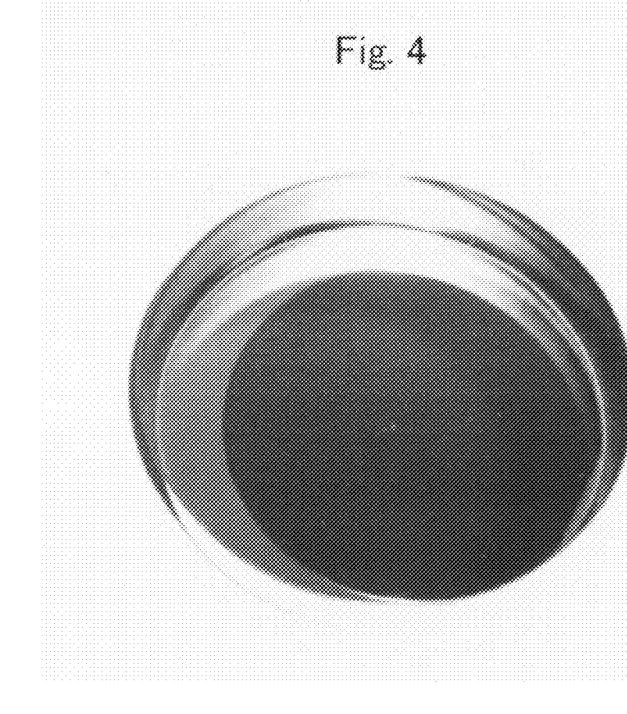
FIG. 4 is a photograph of a polyimide film produced by using a polyimide solution of the invention.

As shown in FIG. 4, the polyimide film obtained by using polyimide solution of the invention was free from foam inclusion and homogenous, and has high quality. In addition, the polyimide film can be obtained with relatively low temperature necessary for only removal of a solvent. Incidentally, deep color of the part of polyimide in FIG. 4 is attributed almost to the penetration of the colors of the silicon substrate, barely attributed to the color of the polyimide film.

Comparative Production Example 5

Production of Polyimide Film

Figure 5:
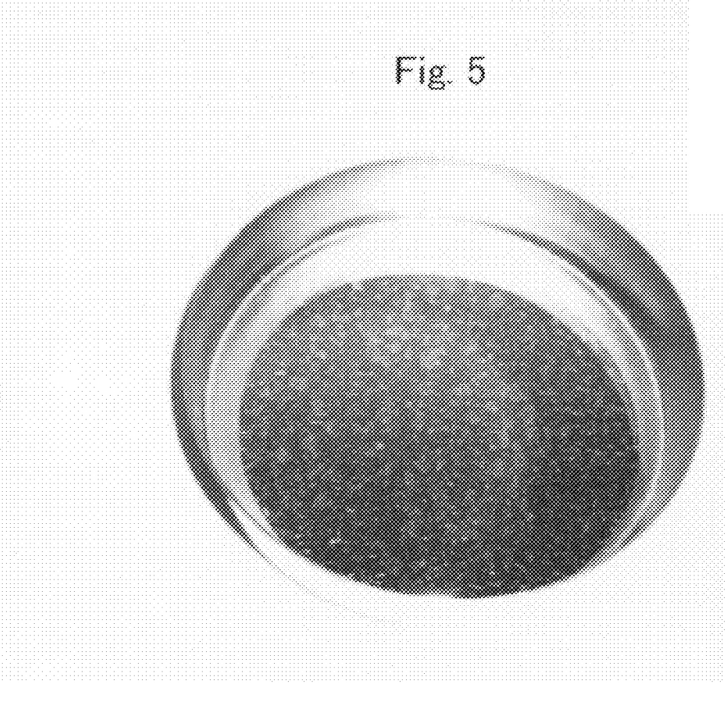
FIG. 5 is a photograph of a polyimide film produced by using a conventional polyamide acid solution.

A polyamide acid solution produced in Example 1-1 was applied on a silicon substrate, and heated at 150° C. for 10 hours similar to the above Example 9. However, many cracks were formed in polyimide film as shown in FIG. 5, and it was impossible to obtain a homogenous film. It was supposed to be because the polyamide chains were cut by heating at a relatively low temperature for a long time to lower the molecular weight. Therefore, when the heating conditions were changed to 320° C. for 1 hour, homogenous polyimide film could be obtained.

Test Example 4

Tensile Test of Polyimide Film

With respect to the polyimide film produced in Production Example 9, a tensile test was carried out according to JIS K7127. More particularly, the film was cut into 10 mm width× 60 mm length. The cut sample was fixed with 50 mm length by a grasping tool in a tensile tester, and pulled at a tensile speed of 2.5 mm/min and 24° C. measurement atmosphere for the tensile test. Also, the polyimide film produced in heating conditions of 320° C. for 1 hour in Comparative Production Example 5 was subjected to the same test. The results are shown in Table 3.

TABLE 3

| | Production Example 7 | Comparative Production Example 2 | |
|---|---|---|---|
| | 150° C. × 10 hour | 320° C. × 1 hour | 150° C. × 10 hour |
| Elastic modulus (kgf/mm$^2$) | 179.7 | 178.5 | — |

According to the results shown above, the polyimide film produced from the polyimide solution of the invention had the almost same strength as that of a conventional polyimide film produced with such high temperature as 320° C.

Production Example 10-1

Production of Polyamide Acid Solution

To a 100 mL three neck flask, 4,4'-Oxydiphthalic anhydride (1.28 g), 4,4'-(1,3-phenylenedioxy)dianiline (1.21 g), and N,N-dimethylacetamide (23.5 g) were charged. The mixed solution was stirred at room temperature in nitrogen atmosphere to obtain an homogenous solution, and was kept still for 2 days to obtain a polyamide acid solution.

Production Example 10-2

Production of Polyimide Solution

The polyamide acid solution (6.3 g) obtained in the above Production Example 10-1 was transferred to a 50 mL container made of polypropylene. To the solution, further acetic anhydride (0.25 g) was added, and the mixture was stirred by a rotation-revolution mixer (AR-250, Thinky Co., Ltd.) in a stirring mode for 1 minute. After that, pyridine (0.001 g) was added. The resulting mixture was mixed by the rotation-revolution mixer in a stirring mode for 10 minutes and a defoaming mode for 1 minute to carry out rapid mixing, and then was kept still for 24 hours to carry out polyimidation. At that time, the concrete conditions of the stirring mode and the defoaming mode were the same as those of Production Example 1-2. The obtained solution was analyzed by FT-IR to find decrease of the peak around 3000 cm$^{-1}$ attributed to carboxyl group and sharp peak appearing around 1700 cm$^{-1}$ attributed to carbonyl group of imide ring, and thereby occurrence of polyimidation could be confirmed.

Production Example 11

Production of Embedded Type Optical Waveguide using Polyimide Solution of the Invention A commercialized UV resin (E 3345, manufactured by NTT-AT) was poured into an optical waveguide die made of silicone rubber, and UV having a wavelength of 365 nm was radiated at 10 mW/cm$^2$ dose for 20 minutes using a very high pressure mercury lamp. Successively, the resin was heated at 100° C. for 1 hour to produce a lower part clad layer having a groove for a core. The sizes of the lower part clad layer having a groove were a core lower part thickness of 0.1 mm, thickness of 0.2 mm other than the portion under core, a core groove depth of 0.1 mm, a core groove width of 0.1 mm, and a core groove length of 70 mm.

The polyimide solution obtained in Production Example 6-3 was applied on the lower part clad layer having the core groove for a core, and heated at 150° C. for 10 hours. The core agent remaining in the portion other than the core groove was removed by using a lapping film 26-4206 manufactured by MARUTO INSTRUMENT CO., LTD. to produce a rectangular core.

The above-mentioned UV resin, E 3345, was applied further on the core, and UV radiation treatment was carried out in the above-mentioned same conditions. Successively heating was carried out at 100° C. for 6 hours to form an upper part clad layer.

After that, an embedded type optical waveguide with a core size of 0.1×0.1 mm and an optical waveguide length of 50 mm was produced by cutting with a dicing saw (DAD 321, manufactured by manufactured by Disco Corporation).

Comparative Production Example 6

Production of Embedded Type Optical Waveguide using Conventional Polyamide Acid Solution The polyamide acid solution obtained in Production Example 1-1 was applied on a lower part clad layer having a groove for a core similar to that used in the above-mentioned Production Example 11, and successively heated at 150° C. for 10 hours. However, many eye-observable cracks were formed in the core to make it impossible to produce a waveguide.

INDUSTRIAL APPLICABILITY

According to the production method of the invention, even in the case of using a polyamide acid solution with a high viscosity as a raw material, a polyimide solution can be produced efficiently at a high imidation ratio in a relatively short time. Accordingly, the method of the invention is particularly suitable for mass synthesis of a polyimide solution in plant scale. Also, the polyimide solution obtained by the method of the invention is free from foam inclusion and has a high concentration and a high viscosity. Therefore, an optical material such as an optical waveguide and an optical fiber, and a polyimide product such as a printed board and an electronic functional material for LSI can be produced efficiently by using the solution as a varnish.

Further, use of the fluorinated polyimide solution of the invention makes it possible to easily produce fluorinated polyimide excellent as an optical material, since the light transmission loss of the optical material especially at the wavelength necessary for light transmission is low.

Further, since the polyimide solution of the invention does not require heating for polyimidation as compared with a conventional polyamide acid solution, a product with a high imidation ratio such as a thick film and a substrate can be obtained by heating at a relatively low temperature. Further, as compared with a polyamide acid solution used commonly for producing a polyimide product, the polyimide solution is highly stable for storage.

Accordingly, the production method of a soluble polyimide solution and the fluorinated polyimide solution of the invention are extremely useful in terms of industrial application.

The invention claimed is:
1. A fluorinated polyimide solution, wherein:
the polyimide solution has a viscosity of 1 Pa·S or higher;
the polyimide solution is produced by a method comprising a step of mixing a mixture containing a polyamide acid defined by the following formula (I):

(I)

wherein X represents a divalent organic group selected from a divalent aryl group, a divalent aryloxy group and a divalent arylthio group, wherein the divalent organic group is optionally substituted by the group consisting of a halogen atom, a methyl group and a trifluoromethyl group; Y represents a divalent organic group; Z represents chlorine atom, bromine atom, or iodine atom; p represents an integer of 1 to 3; q represents an integer of 0 to 2; and p+q=3, a cyclodehydration reagent and a solvent by a rotation-revolution mixing method;
the cyclodehydration reagent is a tertiary amine;
an amount of the tertiary amine is 0.005 to 0.2 equivalents to 1 equivalent of amide unit of the polyamide acid; and
the polyimide is defined by the following formula (II):

(II)

wherein X, Y, Z, p and q are the same as defined above.

2. The fluorinated polyimide solution according to claim 1, wherein a light transmission loss of a polyimide obtained from the fluorinated polyimide solution in a wavelength region of 830 nm, 850 nm, 1310 nm and 1550 nm is 3.5 dB/cm or lower.

* * * * *